Patented Aug. 12, 1952

2,606,925

UNITED STATES PATENT OFFICE 2,606,925

RUTHENIUM CATALYZED HYDROGENATION PROCESS FOR OBTAINING AMINOCYCLOHEXYL COMPOUNDS

Gerald M. Whitman, New Castle, Del., assignor to E. I. du Pont de Nemours & Company, Wilmington, Del., a corporation of Delaware No Drawing. Application December 15, 1949, Serial No. 133,213

11 Claims. (Cl. 260—563)

The invention relates to catalytic hydrogenation processes and more particularly to the catalytic hydrogenation of aromatic compounds containing a nitrogen atom directly attached to an aromatic carbon atom.

This application is a continuation-in-part of my co-pending application Serial No. 615,911, filed September 12, 1945, now abandoned.

It is known to hydrogenate aniline to cyclohexylamine with such catalysts as nickel, osmium, iridium and cobalt. However, even under the best conditions with these catalysts, the yield of desired cyclohexylamine is of the order of 30% to 50% and the cyclohexylamine is accompanied by appreciable amounts of such undesired side reaction products as dicyclohexylamine, N-cyclohexylaniline, benzene, and ammonia, in addition to unchanged aniline. Furthermore, no catalysts have heretofore been known that would permit the efficient one-step hydrogenation of a nitroaromatic compound in high yields to the corresponding cycloaliphatic amine.

It is accordingly an object of this invention to provide a new method for hydrogenating aromatic compounds containing a nitrogen atom attached directly to an aromatic carbon atom to produce the corresponding cycloaliphatic amines. Another object is to provide a new method for catalytically hydrogenating aromatic nitro compounds in one step to the corresponding cycloaliphatic amines. Still another object is to provide a method for hydrogenating aromatic amines to the corresponding cycloaliphatic amines. Other objects will become apparent from an examination of the following description and claims.

These and other objects and advantages are accomplished according to the herein described invention which comprises the preparation of cycloaliphatic amines by reacting as sole reactants and aromatic compound containing a nitrogen atom directly attached to an aromatic carbon atom with hydrogen under pressure, at a temperature of at least 20° C., over a ruthenium catalyst in which the active catalytic component is either elementary ruthenium, a ruthenium oxide, a salt of ruthenium in which the ruthenium is in the anion, or a salt of ruthenium in which the ruthenium is in the cation and the anion is non-polymeric. These ruthenium catalysts are those in which the active catalytic component is selected from the group consisting of elementary ruthenium, ruthenium oxides, salts of ruthenium in which the ruthenium is present in the anion, and salts of ruthenium in which the anion is monomeric and the cation consists of ruthenium. These selected ruthenium catalysts permit the smooth conversion in one-step of aromatic compounds containing a nitrogen atom attached directly to an aromatic carbon to the corresponding cycloaliphatic amines in good yields at lower temperatures than have heretofore been used in effecting such hydrogenations. More particularly these selected ruthenium catalysts promote the hydrogenation of nitro aromatic compounds to amino alicyclic compounds in one-step in good yields at relatively low temperatures.

In a preferred embodiment a pressure reactor is charged with the ruthenium catalyst, the compound to be hydrogenated, and a volatile organic solvent. The reactor is closed, pressured with hydrogen, and the reaction mixture heated with agitation. After an amount of hydrogen corresponding to that theoretically required to effect the desired reduction has been absorbed, agitation is stopped, the reactor allowed to cool, opened and the contents discharged and filtered to remove the catalyst. The reaction product is isolated from the filtrate by distillation or by other means known to those skilled in the art.

The examples below are submitted to illustrate and not to limit this invention. Unless otherwise stated, parts are by weight.

*Example I*

A mixture of 75 parts of nitrobenzene, 75 parts of absolute ethanol, and 2.5 parts of ruthenium oxide catalyst was placed in a pressure vessel and shaken under 135 atms. pressure of hydrogen. At 85° to 90° C. an amount of hydrogen corresponding to the formation of aniline was absorbed, at which point the reaction proceeded much more rapidly and was exothermic to 105° C. The total hydrogen absorption correspnded to that necessary for the formation of cyclohexylamine. The product was discharged from the pressure vessel, filtered to remove catalyst, and the filtrate distilled. At 61° C./49 mm., 51 parts of cyclohexylamine, corresponding to 85% of the theoretical yield, was collected.

The above experiment strikingly demonstrates the unique activity of ruthenium as a low temperature catalyst for the ring and nitro group reduction of aromatic nitro compounds. Thus, it is seen that an amount of hydrogen corresponding to the formation of aniline is taken up at 85° to 90° C. and 135 atms. pressure and that thereafter the ring reduction reaction is rapid and becomes exothermic, causing the temperature to rise to 105° C.

Hydrogenation of nitrobenzene in ethanol solution over an active nickel-on-kieselguhr catalyst under 120 atms. pressure brings about reduction of the nitro group at 100° C. in 1.1 hours, but the reaction then stops because the aniline, and any cyclohexylamine formed, act as poisons for the catalyst. In order to bring about reduction of the aromatic ring it is necessary to effect the reaction in a separate step at a higher temperature. Thus, the ring hydrogenation requires about nine hours, even at 175° C. and 200 to 300 atmospheres pressure, for completion.

*Example II*

A mixture of 50.5 parts of m-dinitrobenzene, 125 parts of dioxane, and 2.5 parts of ruthenium dioxide catalyst was shaken under 125 atms. pressure of hydrogen. At 75° C. the pressure drop corresponded to hydrogenation of the nitro groups to amino groups and at 100° C. to hydrogenation of the aromatic ring. The product was filtered and distilled, giving 75% of the theoretical yield of 1,3-diaminocyclohexane (B. P. 95° to 97°/30 mm., neutral equivalent 57.1).

The above experiment was repeated using, in place of the ruthenium oxide catalyst, the same amount of a platinum oxide catalyst. In this case the nitro groups were hydrogenated readily at low temperature but there was no more hydrogen absorption up to 200° C. Distillation of the reaction product gave only m-phenylenediamine.

Hydrogenation of m-dinitrobenzene with nickel at 175° C. yielded only 10% of 1,3-diaminocyclohexane and with cobalt at 225° C. the yield of 1,3-diaminocyclohexane was only 8%.

*Example III*

A mixture of 50 parts of p-nitroaniline, 125 parts of absolute ethanol and 2.5 parts of ruthenium dioxide catalyst was shaken under 135 atms. pressure of hydrogen. The hydrogen absorption corresponded to hydrogenation of the nitro group at 80° to 85° C., and hydrogenation of the aromatic ring at 105° to 110° C. Distillation of the product gave 74% of the theoretical yield of 1,4-diaminocyclohexane, B. P. 90° C./22 mm., neutral equivalent 57.5.

In another experiment a mixture of 150 parts of p-nitroaniline, 300 parts of dioxane and 15 parts of alloy-skeleton nickel was shaken under 150 atmospheres pressure of hydrogen at 175° C. until hydrogen absorption ceased. After filtration of the product, distillation gave 1,4-diaminocyclohexane corresponding to 35% of the theoretical yield. The distillation residue contained about 45% of the theoretical amount of p-phenylenediamine.

Hydrogenation of p-nitroaniline with cobalt at 175° to 225° C. gave a 34% yield of 1,4-diaminocyclohexane.

*Example IV*

A mixture of 46 parts of benzidine, 125 parts of dioxane and 2 parts of ruthenium dioxide catalyst was shaken under 135 atmospheres pressure of hydrogen at 115° C. until absorption was complete. Distillation of the filtered product gave 92% of the theoretical yield of 4,4'-diaminodicyclohexyl, B. P. 108° C./2 mm., neutral equivalent 99.1.

Hydrogenation of benzidine over a nickel catalyst required a temperature of 180° to 190° C. under 133 to 167 atmospheres pressure for about 5 hours to give hexahydrobenzidine in 38% yield. Under these conditions no 4,4'-diaminodicyclohexyl was obtained.

*Example V*

A mixture of 49.5 parts of bis(4-aminophenyl)-methane, 125 parts of dioxane and 0.35 part of ruthenium oxide-on-charcoal catalyst, prepared as described below, was shaken under 135 atmospheres pressure of hydrogen at 200° C. until absorption ceased. Distillation of the filtered product gave 75% of the theoretical yield of bis(4-aminocyclohexyl)methane, B. P. 142° C./3 mm., neutral equivalent 105.6.

The catalyst used in the above experiment was prepared as follows:

Ten parts of finely divided ruthenium dioxide was fused in a nickel crucible with about 30 parts of sodium peroxide. The melt was dissolved in 200 parts of distilled water and the resulting solution poured with stirring, over 100 parts of activated powdered charcoal. The impregnated charcoal was dried overnight at 105° C. and powdered to a fine black dust. Analysis showed the product to contain about 7% of ruthenium oxide.

In another experiment palladium black was used as the catalyst for the hydrogenation of bis(4-aminophenyl)methane. After two hours at 200° C. under 2500 lbs./in.² hydrogen pressure the reaction was stopped and the product distilled. During this period no pressure drop was observed and no bis(4-aminocyclohexyl)methane was found in the product.

In still another experiment alloy-skeleton nickel was used as the catalyst for the hydrogenation of bis(4-aminophenyl)methane. After a total reaction period of 11 hours at 200° C. and 2000 to 2600 lb./in.² hydrogen pressure the reaction was stopped. No bis(4-aminocyclohexyl)methane was found in the product.

In another experiment elementary cobalt was used as the catalyst for the hydrogenation of bis(4-aminophenyl)methane. After two hours at 200° C. and 2500 to 3000 lb./in.² the reaction was stopped. No bis(4-aminocyclohexyl)methane was found in the reaction product.

*Example VI*

A pressure reactor was charged with 50 parts of bis(4-aminophenyl)methane, 200 parts of dioxane and 2.05 parts of a sodium ruthenate-on-charcoal catalyst containing 7% sodium ruthenate. The reactor was placed in an agitation rack and the contents agitated and subjected to the action of hydrogen under a pressure of 1460 to 3000 lb./in.² at 197° to 206° C. These conditions were maintained for 136 minutes, during which time there was an observed pressure drop of 4820 lb./in.². The reactor was allowed to cool, the contents discharged and filtered to remove the catalyst. From the filtrate there was obtained 47 parts of a fraction boiling at 136° to 144° C./1.5 mm. whose neutral equivalent was 106.4. This corresponded to a yield of bis(4-aminocyclohexyl)methane of 89.5%.

*Example VII*

A pressure reactor was charged with 50 parts of bis(4-aminophenyl)methane, 200 parts of dioxane and 7.6 parts of a potassium ruthenate-on-charcoal catalyst containing 3.63% ruthenium. The reactor was placed in an agitating rack and the contents agitated and subjected to the action of hydrogen under a pressure of 1850 to 3100 lbs./in.² at 207° to 240° C. These conditions were maintained for three hours, during which time there was an observed pressure drop of 4800 lb./in.² The reactor was allowed to cool and the contents discharged and filtered to remove the catalyst. The filtrate was subjected to fractional distillation. There was thus obtained 40.8 parts of a fraction boiling at 139° to 141° C./3 mm., which corresponds to a 77.5% yield of bis(4-aminocyclohexyl) methane. The refractive index of the fraction was 1.5040.

*Example VIII*

A pressure reactor was charged with 50 parts of bis(4-aminophenyl)methane, 200 parts of dioxane and 20 parts of a ruthenium nitroso nitrate-on-alumina catalyst containing 2.4% ruthenium. The reactor was placed in an agitating rack and the contents agitated and subjected to the action of hydrogen under a pressure of 3600 to 4500 lb./in.² at 140° to 152° C. These conditions were maintained for three hours, during which time there was a observed pressure drop of 3375 lb./in.² The reactor was allowed to cool, opened and the contents discharged and filtered. The filtrate was subjected to fractional distillation. There was thus obtained 31.4 parts of material boiling at 148° to 154° C./5 to 4.5 mm., which corresponds to a 72% yield of bis(4-aminocyclohexyl)methane. The index of refraction of this material was 1.5047 at 27° C.

*Example IX*

A pressure reactor was charged with 50 parts of bis(4-aminophenyl)methane, 200 parts of dioxane and 15 parts of a ruthenium chloride-on-alumina catalyst containing 2.4% ruthenium. The reactor was placed in an agitating rack and the contents agitated and subjected to the action of hydrogen under a pressure of 2200 to 4000 lb./in.² at 160° to 172° C. These conditions were maintained for two hours, during which time there was an observed pressure drop of 2655 lb./in.² The reactor was allowed to cool and the contents discharged and filtered to remove the catalyst. The filtrate was subjected to fractional distillation. There was thus obtained 36.2 parts of material boiling at 131° to 144° C./2 mm., which corresponds to a yield of bis(4-aminocyclohexyl)-methane of 73%. The neutral equivalent of the product was 111.4.

The ruthenium chloride-on-alumina catalyst used in the above experiment was prepared as follows:

Ten parts of ruthenium chloride ($RuCl_3$) was dissolved in 99.78 parts of water at room temperature. To the solution there was added 2.36 parts of concentrated hydrochloric acid and the solution allowed to stand for five hours with occasioned stirring. Thereafter the solution was added dropwise, with stirring, to 200 parts of 8 to 14 mesh alumina. The impregnated alumina was transferred to a vacuum desiccator, the vacuum released five times and the material then dried overnight at 130° C. Analysis of the dried product showed it to contain 2.4% ruthenium by weight.

*Example X*

A mixture of 49.5 parts of bis(4-aminophenyl)-methane, 129 parts of dioxane, and 2.5 parts of finely divided ruthenium dioxide catalyst was shaken under 135 atmospheres pressure of hydrogen at 100° C. until hydrogen absorption had ceased. Distillation of the filtered reaction product gave a normally liquid bis(4-aminocyclohexyl)methane in 79.2% yield. This product boiled at 141° to 143° C./4 mm., had an $N_D^{32.5° C.}$ of 1.5030 and a neutral equivalent of 105.0. The calculated neutral equivalent for $C_{13}H_{26}N_2$ is 105.2.

*Example XI*

A dioxane solution of bis(4-aminophenyl)-methane containing 13% by weight of the diamine was mixed at 300 atmospheres pressure with from 50 to 100 moles of hydrogen per mole of bis(4-aminophenyl)methane, and the mixture passed over a ruthenium dioxide-on-charcoal catalyst, prepared as described subsequently, as a space velocity of 0.14 volume of bis(4-aminophenyl)-methane per volume of catalyst per hour. The catalyst temperature was maintained at 143° to 148° C. Ninety and six tenths per cent of the starting material was found to be converted to a mixture of bis(4-aminocyclohexyl)methanes which was liquid at room temperature and which had a refractive index of $N_D^{25° C.}$ of 1.5059.

The catalyst used in the above experiment was prepared as follows:

Ten parts of ruthenium dioxide was fused with 50 parts of potassium hydroxide. To the fused mass there was added 10 parts of potassium nitrate over a 5 minute period, and the mixture maintained at the fusion point for one hour. Thereafter it was allowed to cool and dissolved in 120 parts of distilled water. The resulting solution was poured over activated charcoal which had been previously washed with a 10% solution of potassium hydroxide and dried at 110° C. for 48 hours. The volume ratio of solution to activated charcoal was 2:3. The impregnated charcoal was then heated to about 50° C., 15 parts of methanol was added, and the composition dried at 110° C. The resulting composition contained about 4.5% of ruthenium dioxide.

*Example XII*

A mixture of 1250 parts of bis(4-aminophenyl)-methane, 3234 parts of dioxane, and 25 parts of finely divided ruthenium dioxide catalyst was placed in a pressure reactor and subjected, with stirring, to a hydrogen pressure of 1500 to 2700 lb./in.² at a temperature of 105° to 120° C. These conditions were maintained for 4.5 hours, even though hydrogen absorption had ceased at the end of four hours. At the end of the 4.5 hour reaction period, the reactor was allowed to cool, opened, discharged, and the contents filtered to remove the catalyst. From the filtrate there was isolated, by distillation, 1147.8 parts of bis(4-aminocyclohexyl)methane as a clear, colorless viscous liquid. The yield of bis(4-aminocyclohexyl methane corresponded to 86.7%. The material obtained had a boiling point of 121° C./0.5 mm. and 123° C./0.75 mm. The neutral equivalent was 105.25 and the refractive index, $N_D^{29.5° C.}$, 1.5042.

The ruthenium catalysts used in the practice of this invention consist of elementary ruthenium, ruthenium oxides, such as ruthenium sesquioxide, ruthenium dioxide and ruthenium tetroxide; salts of ruthenium in which the ruthenium is present in the anion, such as perruthenites, e. g., barium perruthenite, sodium perruthenite, etc., ruthenates such as sodium, potassium, barium, silver, calcium, strontium and magnesium ruthenates, etc.; perruthenates such as potassium and sodium perruthenates, etc.; ruthenium chloro salts, e. g., potassium chloro perruthenate, etc.; salts of ruthenium in which the cation consists of ruthenium and the anion is monomeric, such as ruthenium halides, e. g., ruthenium dichloride, ruthenium trichloride, ruthenium tetrachloride, ruthenium pentafluoride, etc.; ruthenium sulfides, e. g., ruthenium disulfide and trisulfide, etc.; ruthenium sulfate, etc.

Optimum results are obtained when the ruthenium catalyst is in finely divided form. When it is desired to employ very low catalyst concentrations, it is advisable to extend the ruthenium on a support, e. g., charcoal, alumina, kieselguhr, etc. Such supported catalysts may be prepared by the methods of Examples V, IX, and XI, by the method disclosed in U. S. Patent 2,079,404, or by other methods involving reduction of a compound of ruthenium in the presence of a carrier substance.

The amount of ruthenium catalyst used, calculated as metallic ruthenium, may vary within the range of from 0.001% to 5% by weight of aromatic compound being reduced. The exact percentage employed depends upon whether it is desired to effect the reaction at a low temperature or whether catalyst economy is the paramount consideration. Generally, however, the amount of ruthenium catalyst, calculated as metallic ruthenium, will range between 0.01% and 1% by weight of the aromatic compound being reduced, because within this range a proper balance between reaction rate and catalyst economy is attained.

The ruthenium catalysts of this invention catalyze the ring hydrogenation of aromatic organic compounds containing a nitrogen atom directly attached to an aromatic carbon atom at temperatures in the range of 20° to 150° C. and are unique in this respect. If desired, in the case of polycyclic aromatic amines such as bis(4-aminophenyl)methane, temperatures up to 250° C. may be employed. The particular temperature selected for the hydrogenation depends upon the method of operation and the type of stereoisomeric mixture of bis(4-aminocyclohexyl) methane desired. Thus, if it is desired to operate batch-wise to produce a liquid stereoisomeric mixture of bis(4-aminocyclohexyl)methanes temperatures below 130° C. are employed. If it is desired to operate continuously at very low contact time, as shown by Example XI, temperatures up to about 150° C. can be used. If it is desired to produce a normally solid stereoisomeric mixture of bis(4-aminocyclohexyl)methanes then temperatures above 150° C., but below 250° C. are used. The following simplified diagrams will aid in explaining these phenomena. Bis(4-aminocyclohexyl)methane exists in three stereoisomeric forms and all three result from the hydrogenation of bis(4-aminophenyl)methane. The long horizontal lines in the diagram below represent an edge view of a cyclohexane residue.

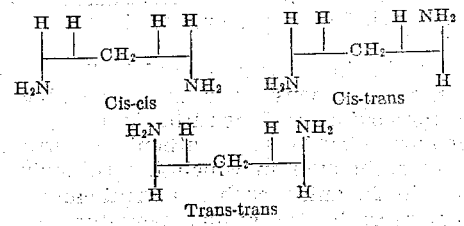

In the hydrogenation of the bis(4-aminophenyl)methane at a low temperature, i. e., at a temperature below 150° C., a bis(4-aminocyclohexyl)methane results which is believed to consist principally of a mixture of the cis-cis and cis-trans isomers. By carrying on the hydrogenation above 150° C., or by prolonging the time of contact between the bis(4-aminophenyl)methane and catalyst, the initial cis-cis and cis-trans isomer mixture seems to isomerize to the higher melting trans-trans form. Since the base metals require the use of temperatures above 200° C. to induce hydrogenation of the aromatic nuclei in bis(4-aminophenyl)methane, it is clear that with these catalysts it is not possible to obtain an isomer mixture of bis(4-aminocyclohexyl)methane consisting principally of cis-cis or cis-trans forms. Thus, use of ruthenium makes possible the obtainment of bis(4-aminocyclohexyl)methane isomer mixtures not otherwise obtainable.

While this invention has been illustrated with particular reference to the hydrogenation of nitroaryl and aminoaryl compounds, such as nitrobenzene, dinitrobenzene, nitroaniline, benzidine, and bis(4-aminophenyl)methane, it is to be understood that it is generic to the ring hydrogenation of all aromatic organic compounds containing a nitrogen atom directly attached to an aromatic carbon atom. Examples of such compounds are nitro and nitroso compounds such as nitrobenzene, nitrotoluene, dinitrobenzenes, dinitrotoluenes, 1,3,5-trinitronaphthalenes, alpha-nitronaphthalene, m-nitrobenzoic acid, m-nitrobenzonitrile, 2,4-dinitroanisole, 3-nitro-o-cresol, o-nitrodiphenylamine, 2-nitroresorcinol, 1-nitronaphthol-2, m-nitroaniline, 5-nitro-1,3-xylenol, nitrosobenzene, nitrosotoluene, m-nitro-N-methylaniline, dinitrodiphenyl, bis(4-nitrophenyl)methane, etc., aromatic amines, such as aniline, benzidine, tolidine, aminobenzoic acids, aminobenzonitrile, N-methylaniline, N-dimethylaniline, toluidines, aminocresols, 3,5-diaminophenol, 1,5-diaminonaphthalene, etc., azo, azoxy, and hydrazo compounds such as azobenzene, azoxybenzene, 2-hydroxyazobene, p-azoxytoluene, hydrazobenzene, etc. Preferred aromatic compounds are those having nitrogen directly attached to an aromatic carbon atom as the sole substituent.

Although in the examples there have been used certain conditions of temperature and pressure, concentration, duration of reaction, etc., it is to be understood that these values may be varied somewhat within the scope of the invention since the conditions for each experiment are determined by the particular compound being treated.

The process is operable at pressures ranging from atmospheric up to the maximum permitted by the mechanical limitations of the equipment used. The particular pressure conditions used in any one case depend upon such interdependent factors as method of operation, temperature conditions employed, etc. As a rule pressures in excess of 100 lb./in.$^2$ are employed because under such conditions the reaction takes place at a practical rate with good yields of desired products. Irrespective of the method of operation no practical advantages seem to accrue from the use of pressures above 20,000 lb./in.$^2$. Most generally the process is carried out using pressure of from 1,000 to 10,000 lb./in.$^2$.

The process of this invention may be carried out while the aromatic compound is in a fluid condition, i. e., is either a liquid, dissolved in an inert organic solvent, or in the form of a vapor. Said process is generally operated in the presence of an inert organic medium because the medium acts as a heat dissipator, thus making it possible to control the temperature more closely, and because optimum conditions for complete hydrogenation are realized in solution. Usefully employable inert organic media are alcohols such as methanol, ethanol, propanol, isopropanol, etc.; ethers such as dioxane, diethyl ether, etc.; hydrocarbons such as cyclohexane, etc.

The process of this invention, by employing selected ruthenium catalysts, makes possible the preparation of cyclo aliphatic amines in good yields from the corresponding aromatic compounds in one step at low temperatures.

Although base metals such as nickel and cobalt are poisoned by cyclic amines, ruthenium can desorb such amines readily and it is not poisoned by these amines. With the base metals it is necessary to employ high temperatures in order to counteract the poisoning effect of the cyclic amines, and this operates to decrease the yield of desired cyclic amine. The striking ability of ruthenium to catalyze the hydrogenation of aromatic amines rapidly, at low temperatures, under non-acid conditions is based upon its radically different surface absorption characteristics for cyclic amines as compared to other catalytsts. This ability to desorb cyclic amines at low temperatures distinguishes ruthenium from all other catalysts. Thus, it is the only catalyst with which cyclic amines can be obtained under non-acid conditions at low temperatures, e. g., at temperatures below 150° C.

As many apparently widely different embodiments of this invention may be made without departing from the spirit and scope thereof, it is to be understood that I do not limit myself to the specific embodiments thereof except as defined in the appended claims.

I claim:

1. In a process for obtaining an aminocyclohexyl compound by hydrogenation of an aromatic compound containing a benzene nucleus and a nitrogen atom directly attached thereto, the improvement which comprises reacting, as the sole reactants, hydrogen and said aromatic compound containing a benzene nucleus and a nitrogen atom directly attached thereto, at a temperature within the range of from 20° to 250° C., under pressure in excess of 100 lbs./sq. in., and in contact with at least 0.01% by weight, based on said aromatic compound and calculated as metallic ruthenium, of a ruthenium catalyst in which the active catalytic component is selected from the group consisting of elementary ruthenium, ruthenium oxides, salts or ruthenium in which the ruthenium is present in the anion, and monomeric ruthenium salts in which the cation consists of ruthenium, and isolating therefrom an aminocyclohexyl compound.

2. In a process as set forth in claim 1 wherein said ruthenium catalyst is elementary ruthenium.

3. In a process as set forth in claim 1 wherein said ruthenium catalyst is a ruthenium oxide.

4. In a process as set forth in claim 1 wherein said ruthenium catalyst is supported on a carrier.

5. In a process for obtaining an aminocyclohexyl compound by hydrogenation of an aromatic compound containing a benzene nucleus and a nitrogen atom directly attached thereto, the improvement which comprises reacting, as the sole reactants in an inert organic solvent, hydrogen and said aromatic compound containing a benzene nucleus and a nitrogen atom directly attached thereto, at a temperature within the range of from 20° to 150° C. under pressure in excess of 100 lbs./sq. in., and in contact with at least 0.01% by weight, based on said aromatic compound and calculated as metallic ruthenium, of a ruthenium catalyst in which the active catalytic component is selected from the group consisting of elementary ruthenium, ruthenium oxides, salts of ruthenium in which the ruthenium is present in the anion, and monomeric ruthenium salts in which the cation consists of ruthenium, and isolating therefrom an aminocyclohexyl compound.

6. In a process for obtaining an aminocyclohexyl compound by hydrogenation of an aromatic compound containing a benzene nucleus and a nitro group directly attached thereto, the improvement which comprises reacting, as the sole reactants, hydrogen and said aromatic nitro compound, at a temperature within the range of from 20° to 150° C. under pressure in excess of 100 lbs./sq. in., and in contact with at least 0.01% by weight, based on said aromatic nitro compound and calculated as metallic ruthenium, of a ruthenium catalyst in which the active catalytic component is selected from the group consisting of elementary ruthenium, ruthenium oxides, salts of ruthenium in which the ruthenium is present in the anion, and monomeric ruthenium salts in which the cation consists of ruthenium, and isolating therefrom an aminocyclohexyl compound.

7. In a process for obtaining cyclohexylamine by hydrogenation of nitrobenzene, the improvement which comprises reacting, as the sole reactants in an inert organic solvent, hydrogen and nitrobenzene, at a temperature within the range of 20° to 150° C. under pressure in excess of 100 lbs./sq. in., and in contact with at least 0.01% by weight, based on said nitrobenzene and calculated as metallic ruthenium, of a ruthenium catalyst in which the active catalytic component is selected from the group consisting of elementary ruthenium, ruthenium oxides, salts of ruthenium in which the ruthenium is present in the anion, and monomeric ruthenium salts in which the cation consists of ruthenium, and isolating therefrom cyclohexylamine.

8. In a process for obtaining an aminocyclohexyl compound by hydrogenation of an aromatic compound containing a benzene nucleus and an amino group directly attached thereto, the improvement which comprises reacting, as the sole reactants, hydrogen and said aromatic amino compound, at a temperature within the range of from 20° to 150° C., under pressure in excess of 100 lbs./sq. in., and in contact with at least 0.01% by weight, based on said aromatic amino compound and calculated as metallic ruthenium, of a ruthenium catalyst in which the active catalytic component is selected from the group consisting of elementary ruthenium, ruthenium oxides, salts of ruthenium in which the ruthenium is present in the anion, and monomeric ruthenium salts in which the cation consists of ruthenium, and isolating therefrom an aminocyclohexyl compound.

9. In a process for obtaining bis(4-aminocyclohexyl)methane by hydrogenation of bis(4-aminophenyl)methane, the improvement which comprises reacting, as the sole reactants, hydrogen and bis(4-aminophenyl)methane, at a temperature within the range of from 20° to 250° C., under pressure in excess of 100 lbs./sq. in., and in contact with at least 0.01% by weight, based on said bis(4-aminophenyl)methane and calculated as metallic ruthenium, of a ruthenium catalyst in which the active catalytic component is selected from the group consisting of elementary ruthenium, ruthenium oxides, salts of ruthenium in which the ruthenium is present in the anion, and monomeric ruthenium salts in which the cation consists of ruthenium, and isolating therefrom bis(4-aminocyclohexyl)methane.

10. In a process as set forth in claim 9 wherein said ruthenium catalyst is a ruthenium chloride catalyst.

11. In a process as set forth in claim 9 wherein the reaction is carried out in the presence of methanol.

GERALD M. WHITMAN.

REFERENCES CITED

The following references are of record in the file of this patent:

UNITED STATES PATENTS

| Number | Name | Date |
|---|---|---|
| 1,907,820 | Jaeger | May 9, 1933 |
| 2,132,389 | Bertsch | Oct. 11, 1938 |
| 2,494,563 | Kirk et al. | Jan. 17, 1950 |

FOREIGN PATENTS

| Number | Country | Date |
|---|---|---|
| 56,448 | Netherlands | June 15, 1944 |

OTHER REFERENCES

Behr et al.: J. A. C. S., vol. 68, pages 1296–1297 (1946).